INVENTORS
OTTO ERNST
EUGEN KUSENBERG
ERNST HUBLER
HANS-RUDOLF AUS DER AU

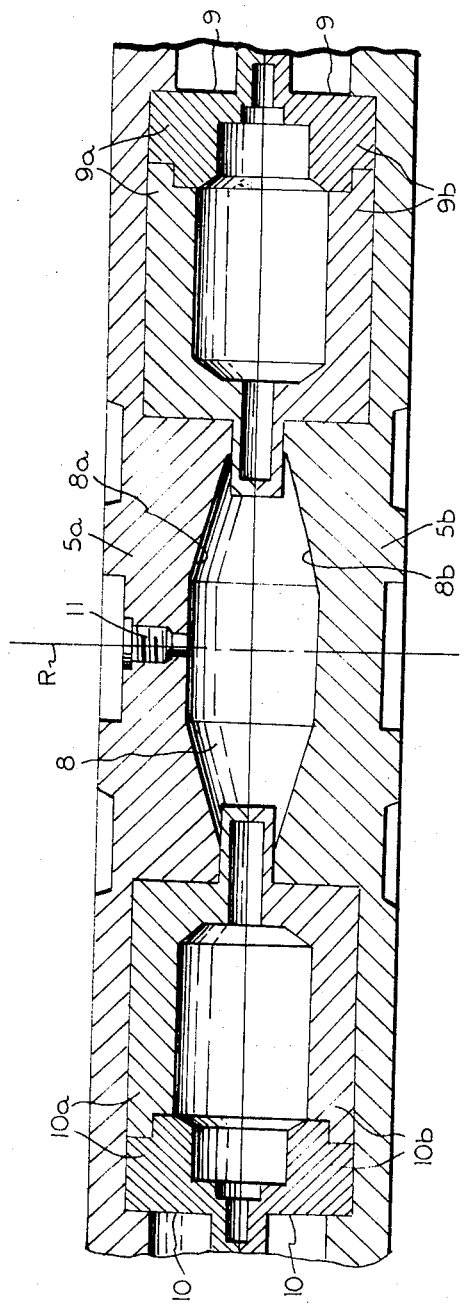

United States Patent Office 3,754,071
Patented Aug. 21, 1973

3,754,071
PROCESS FOR IMPREGNATING BODIES WITH A CASTING RESIN COMPOSITION
Otto Ernst, Pfeffingen, Eugen Kusenberg, Basel, Ernst Hubler, Aesch, and Hans-Rudolf Aus der Au, Reinach, Basel-Land, Switzerland, assignors to Ciba-Geigy A.G.
Filed Aug. 20, 1970, Ser. No. 65,486
Claims priority, application Switzerland, Aug. 21, 1969, 12,704/69
Int. Cl. B44d 1/09, 1/42
U.S. Cl. 264—272  7 Claims

ABSTRACT OF THE DISCLOSURE

A body to be impregnated, such as an electrical winding, is placed in a cavity where it is preferably held by a mould insert and the two members are clamped together and rotated about an axis lying outside the space enclosed by any cavity. The cavity and body are preheated by heating means and a highly reactive casting resin composition, which includes a filler, which is capable of hardening and solidifying within a period of from 1 to 60 minutes, and of which the resin is preferably an epoxy resin is introduced into the chamber from whence it flows under centrifugal action in the cavity to impregnate the body. The resin composition is allowed to harden and solidify under pressure caused either by the centrifugal action or by a pressure medium, and the impregnated body is then removed. The cavity is preheated to a temperature sufficient to initiate the hardening reaction of the casting resin composition and the temperature at which the casting resin composition is introduced is at least 10% below the temperature of the cavity, both such temperatures being measured in degrees centigrade.

---

Figure 1:
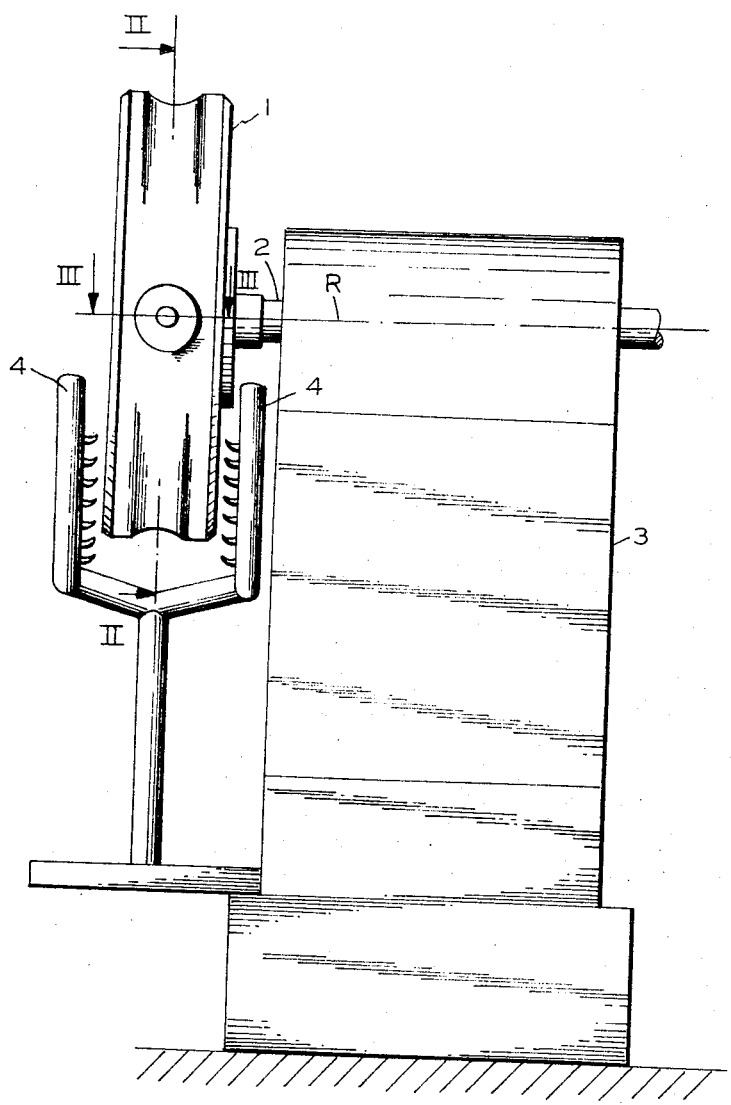

This invention relates to a method of impregnating bodies, such as electrical windings with hardenable casting resin compositions containing fillers.

According to one aspect of the present invention there is provided a method of impregnating a body with a casting resin composition, wherein a body to be impregnated is placed in a cavity which is rotated about an axis lying outside the space enclosed by the cavity while being preheated, and wherein a highly reactive casting resin composition which includes a filler material and which is capable of hardening and solidifying within a period of one to sixty minutes is introduced into the cavity to effect impregnation of the body under pressure due to the action of centrifugal forces generated by the rotation of the cavity, the casting resin composition being allowed to harden and solidify under pressure and the impregnated body being removed from the cavity when the casting resin composition has hardened and solidified sufficiently to permit such removal; the cavity being preheated to a temperature sufficient to initiate the hardening reaction of the casting resin composition, and the temperature at which casting resin composition is introduced being at least 10% below the temperature of the cavity, both said temperatures being measured in degrees centigrade.

The cavity may be rotated about the axis until the casting resin composition, of which the resin is preferably an epoxy resin, has solidified, or the rotation may be stopped before the casting resin composition has solidified in which case pressure is applied to the impregnated body in the cavity by means of a pressure medium.

The present method enables bodies to be impregnated with minimum mould occupation times. An advantage of the present method is that casting resin compositions having a high filler content can be used to effect impregnation. In consequence of the use of a highly reactive resin which hardens in a short period of time, however, no marked sedimentation of filler occurs. In this method the grain size of the filler must naturally be smaller than the pore size of the part to be impregnated.

In carrying out the method of the present invention there may be provided an apparatus for impregnating a body with a casting resin composition, wherein first and second mould members, which are adapted to be clamped together to define between them at least one cavity, the or each of which is intended to receive a body to be impregnated, an inlet chamber and channel means leading from the inlet chamber to the or each cavity, are arranged to be mounted for rotation, when in clamped relation, about an axis passing through said chamber, and wherein heating means are provided for heating said mould members during rotation thereof, the arrangement being such that, when a body to be impregated is placed in the, or each cavity and the mould members have been preheated by said heating means, casting resin composition can be introduced into said chamber and will flow through said channel means into the, or each cavity under the action of centrifugal forces generated by rotation of the clamped mould members, thereby to impregnate the or each body under pressure.

The mould members are preferably disc-shaped and define a plurality of, e.g. four axially symmetrical cavities of which the axes lie perpendicular to the axis of rotation and are equiangularly spaced about the inlet chamber. Although the bodies may be placed directly in the cavities, it is preferred to hold the body in its cavity by a mould insert which is axially symmetrical and is divided along an axial plane, the axis of symmetry lying perpendicular to the axis of rotation, one part of the insert being adapted to be fixed to one mould member and the other part being adapted to be fixed to the other mould member.

Figure 2:
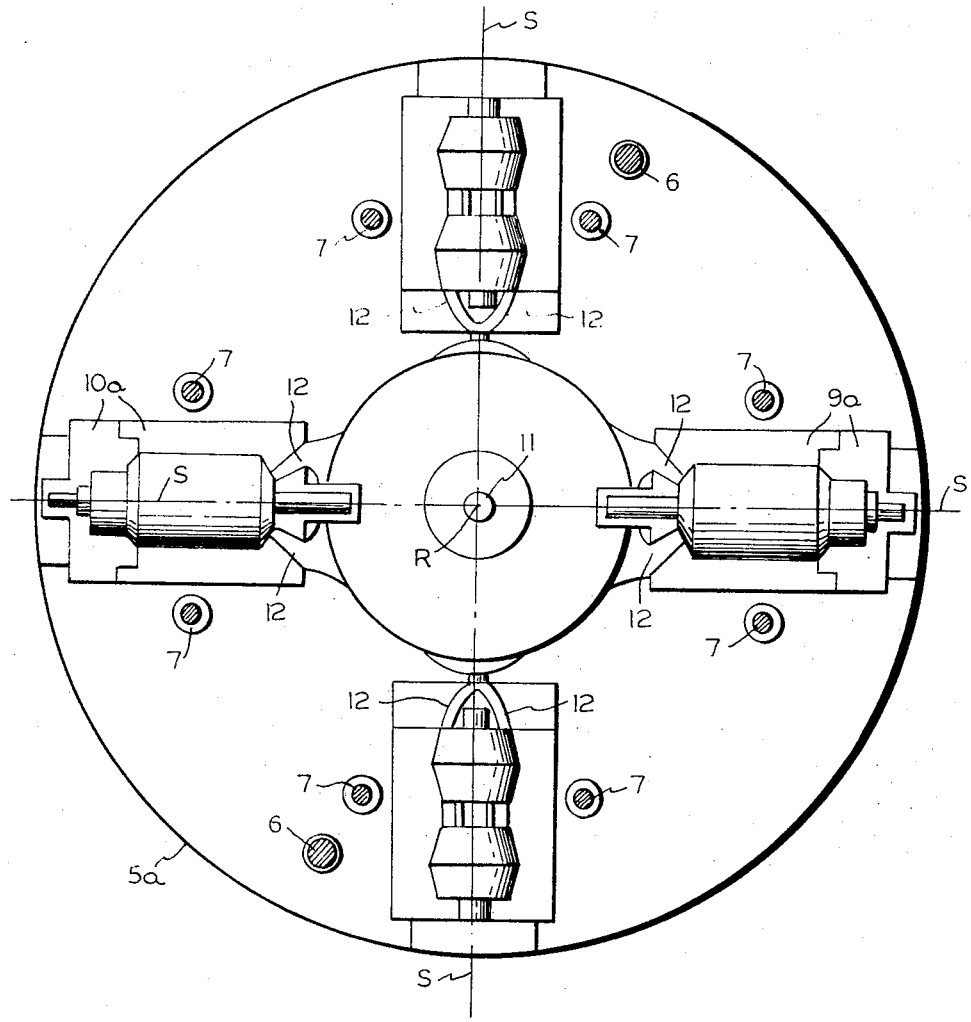

In order to enable the invention to be more readily understood, reference will now be made to the accompanying drawings, which illustrate diagrammatically and by way of example structure which may be employed therein, and in which:

FIG. 1 is a general view in side elevation of apparatus for impregnating bodies, FIG. 2 is a section along the line II—II in FIG. 1, and FIG. 3 is a section along the line III—III in FIG. 1.

Referring now to the drawings, there is shown apparatus for impregnating bodies with a casting resin composition. The apparatus comprises a two-part mould carrier 1 one part of which is mounted on a shaft 2 held in a frame 3. The shaft 2 is arranged to be driven by conventional drive means (not shown) at an adjustable speed and thus to rotate the mould carrier 1. A heating device 4 comprising gas burners is provided for heating the mould carrier 1 as it is rotated.

As shown in FIGS. 2 and 3, the mould carrier is formed by two discs 5a and 5b which are substantially mirror images of one another and which can be clamped together in a leakproof manner by means of screws 7, locating pins 6 being provided for ensuring that the two discs are correctly in register with one another. The two discs 5a and 5b are formed in a central region with recesses 8a and 8b respectively. Around the central recess 8a or 8b of each disc there are formed four additional recesses which together form four cavities in which half-moulds 9a, 10a and 9b, 10b respectively can be inserted, so that half-moulds form four complete moulds 9 and 10 respectively when the discs are clamped together, the moulds being equiangularly spaced around the axis of rotation of the mould carrier 1. The central recesses 8a and 8b in the discs 5a and 5b respectively form an inlet chamber 8 when the discs are clamped together, and casting resin composition and/or a pressure medium can be introduced into said chamber from outside through a bore 11. Each of the moulds 9 and 10 is in communication with the chamber 8 through at least one channel 12.

In FIG. 2, it is to be noted that mould inserts of two different shapes are shown, the left and right hand inserts being the half-moulds 9a and 10a shown in FIG. 3, while the top and bottom inserts are of a different shape. In certain cases the mould inserts may be dispensed with and the cavities themselves arranged to receive directly the objects to be impregnated. It is essential that in axially symmetrical moulds the axes S of the latter should lie at least approximately perpendicular to the axis of rotation R of the mould carrier. Through this arrangement it is ensured that no dynamic unbalance (in relation to the axis of symmetry) is produced by the impregnation, which is particularly important in the impregnation of electric rotors.

Furthermore, the discs 5a and 5b may be shaped differently from what is shown in the drawings, and, if desired, the mould carrier 1 may be arranged to be rotated about a vertical axis.

In the operation of the apparatus illustrated in the drawings, the discs 5a and 5b are separated and the objects to be impregnated are first inserted into the moulds 9 and 10 whereafter the discs are clamped together. The disc 5b may be fastened on the drive shaft 2 either before or after the discs are clamped together. After the discs 5a and 5b have been clamped together and fastened on the drive shaft 2, they are rotated by switching-on the drive, with the gas burners 4 lit, until the desired mould temperature has been reached. The amount of casting resin compound required for impregnation is thereupon introduced into the chamber 8 through the bore 11 of the disc 5a. During this filling operation, the rotation and heating may be briefly interrupted; it is however preferable to work with continuous rotation and heating. The centrifugal forces produced by the rotation deliver the casting resin composition out of the chamber 8 through the channels 12 into the moulds or to the bodies which are to be impregnated. In order to produce the necessary after-pressure, the rotation is preferably continued until the casting resin composition has solidified. It is, however, also possible to terminate the rotation and to produce the after-pressure by introducing a pressure medium through the bore 11.

Four examples of the impregnation of rotors of electrical machines in the apparatus illustrated in the drawings are given below.

EXAMPLE 1

2500 parts by weight of the quartz flour obtainable under the commercial designation K 8 were mixed at 120 to 130° C. in 750 parts by weight of a glycidyl polyether resin which is solid at ordinary temperature and which has an epoxide content of 2.6 epoxide equivalents per kg., and deaerated in a water-jet vacuum. The resin was produced by reacting epichlorohydrin with bis-(4-hydroxyphenol)-dimethylmethane in the presence of alkali. After adding 225 parts by weight of phthalic anhydride, 10 parts by weight of isomerised methyltetrahydrophthalic anhydride, 0.33 to 0.66 part by weight of benzyl dimethylamine and up to 0.39 part by weight of tetrabutyl titanate, evacuation was effected again for a short time.

The pourable sealing compound obtained in this manner was introduced at a temperature of 120 to 130° C. into chamber 8 of the apparatus illustrated in the drawings, with the mould carrier heated to a temperature of 160° C. in the region of the moulds, and rotating at 500 r.p.m. After only 10 minutes it was possible to cease rotation and remove the impregnated rotors from the moulds.

EXAMPLE 2

160 parts of dibutyl phthalate and 1200 parts by weight of the aluminium oxide trihydrate obtainable under the commercial name DT 080 from Ciba A.G., Basle, were mixed at 40 to 50° C. in 640 parts by weight of a glycidyl polyether resin which is liquid at ordinary temperature and has an epoxide content of 5.4 epoxide equivalents per kg. and a viscosity of about 10,000 cp., measured at 25° C. the resin having been produced by reacting epichlorohydrin with bis-(4-hydroxyphenyl) - dimethylmethane). Deaeration was then effected by a water-jet vacuum and 60 parts of triethylene tetramine were added as a hardening agent, whereupon evacuation was again effected for a short time.

The casting resin mixture obtained in this manner was introduced at a temperature of 40 to 50° C. into the chamber 8 of the apparatus illustrated in the drawings, which had been preheated to 90° C. in the region of the moulds and which was rotated at 300 r.p.m. After only 10 minutes it was possible to terminate the rotation and remove the impregnated rotors from the moulds.

EXAMPLE 3

375 parts by weight of hexahydrophthalic anhydride, as hardening agent, and 1650 parts by weight of the aluminium oxide trihydrate described in Example 2, as filler, were added at 80 to 90° C. to 375 parts of 3,4-tetrahydrophthalic diglycidyl ester which is liquid at ordinary temperature and has an epoxide content of 6.3±0.3 epoxide equivalents per kg. and a viscosity at 25° C. of 450 to 550 cp., and deaeration was effected by means of a water-jet vacuum for 10 minutes. 23 parts by weight of a mixture consisting of 21 parts by weight of a sodium alcoholate, produced by dissolving 0.82 part of metallic sodium at 120° C. in 100 parts of 2,4-dihydroxy-3-hydroxymethylpentane, and 2 parts by weight of benzyl dimethylamine were added, whereupon deaeration was effected briefly with a water-jet vacuum, and the resulting mixture was introduced at a temperature of 80 to 90° C. into the chamber 8 of the apparatus illustrated in the drawings, which had been heated to 137° C. in the region of the moulds, and which was rotating at 300 r.p.m. After only 5 minutes it was possible to terminate the rotation and remove the impregnated rotors from the moulds.

EXAMPLE 4

330 parts by weight of hexahydrophthalic anhydride, as hardening agent, and 1500 parts by weight of the aluminium oxide trihydrate described in Example 2 were mixed at 85 to 95° C. in 350 parts by weight of a 3 - (3',4' - epoxycylohexyl) - 2,4 - dioxaspiro(5,5)-9,10-epoxyundecane which is liquid at ordinary temperature and has an epoxide content of 6.2 epoxide equivalents per kg. and a viscosity at 25° C. of 200,000 cp. 21 parts by weight of the accelerator described in Example 3 were then added.

The pourable sealing compound obtained in this manner was introduced at a temperature of 80° C. into the chamber of the apparatus illustrated in the drawings, which had been heated to 150° C. in the region of the moulds and which was rotating at 300 r.p.m. The rotation was discontinued immediately after completion of the filling operation and a superatmospheric pressure of about 1 kg./cm.$^2$ was applied to the filling aperture. After only 10 minutes it was possible to discontinue the pressure and to remove the impregnated rotors from the moulds.

The impregnated rotors obtained in Examples 1 to 4 were of good quality and exhibited no detectable cavities.

What is claimed is:

1. A method of impregnating an electrical winding with a casting resin composition, comprising the steps of providing a cavity for the reception of a body to be impregnated, placing the body in the cavity, preheating the cavity and the body contained therein, introducing a highly-reactive casting liquid resin composition including a filler material into the cavity, rotating the cavity and body about an axis lying outside the space enclosed by the cavity thereby to effect impregnation of the body under pressure due to the action of centrifugal forces, allowing the casting resin composition to harden and solidify under pressure, stopping the rotation of the cavity, and, when the casting resin composition has solidified sufficiently to permit removal of the impregnated body from the cavity, removing the impregnated body from the cavity; the liquid casting resin composition being one which hardens and solidifies within a period of from one to sixty minutes, the cavity being preheated to a temperature sufficient to initiate the hardening reaction of the casting resin composition, and the temperature at which the casting resin is introduced being at least 10% below the temperature of the mould, both said temperatures being measured in degrees centigrade.

2. The method of claim 1, wherein at least one mould insert is provided in the cavity for the reception of the electrical winding.

3. The method of claim 1, wherein the rotation of the cavity is stopped before the liquid casting resin composition has solidified and pressure is applied to the impregnated body in the cavity by means of a pressure medium.

4. The method of claim 1, wherein the liquid resin is an epoxy resin.

5. The method of claim 1, wherein the liquid casting resin composition is one which solidifies within ten minutes.

6. The method of claim 1, wherein the liquid casting resin composition is one which solidifies within five minutes.

7. The method of claim 1, wherein the temperature at which the liquid casting resin composition is introduced is about 18 to 56% below the temperature of the mould, both said temperatures being measured in degrees centigrade.

References Cited

UNITED STATES PATENTS

| | | | |
|---|---|---|---|
| 3,619,865 | 11/1971 | Hazzard | 118—52 |
| 2,561,982 | 7/1951 | Hanna et al. | 117—232 |
| 2,664,364 | 12/1953 | Thom | 117—232 |
| 3,071,496 | 1/1963 | Fromm et al. | 117—232 |
| 3,355,310 | 11/1967 | DeJean et al. | 117—18 |
| 3,456,615 | 7/1969 | Heinz-Jurgen Zander | 118—53 |

MURRAY KATZ, Primary Examiner

H. J. GWINNELL, Assistant Examiner

U.S. Cl. X.R.

117—95, 101, 232; 118—52; 264—275, 311